(12) United States Patent
Fehrer et al.

(10) Patent No.: US 7,076,310 B2
(45) Date of Patent: Jul. 11, 2006

(54) ELECTRONIC APPARATUS FOR A BUS SYSTEM

(75) Inventors: Detlef Fehrer, Gundelfingen (DE); Sebastian Heidepriem, Neuenburg (DE); Edgar Stadler, Emmendingen (DE)

(73) Assignee: Sick AG, Waldkirch/Breisgau (DE)

( * ) Notice: Subject to any disclaimer, the term of this patent is extended or adjusted under 35 U.S.C. 154(b) by 0 days.

(21) Appl. No.: 10/666,854

(22) Filed: Sep. 18, 2003

(65) Prior Publication Data

US 2004/0098139 A1 May 20, 2004

(30) Foreign Application Priority Data

Sep. 20, 2002 (DE) ................. 102 43 783

(51) Int. Cl.
 *G05B 15/00* (2006.01)
 *G06F 3/00* (2006.01)
 *G06F 13/42* (2006.01)
 *H04J 3/22* (2006.01)

(52) U.S. Cl. ............................. 700/1; 710/11; 710/105; 370/466

(58) Field of Classification Search ................ 700/295, 700/282, 1; 710/11–12, 105; 709/203, 223–225; 370/310, 466
See application file for complete search history.

(56) References Cited

U.S. PATENT DOCUMENTS

| | | | |
|---|---|---|---|
| 4,858,112 A | | 8/1989 | Puerzer et al. ............... 709/230 |
| 5,187,787 A | * | 2/1993 | Skeen et al. ................. 719/314 |
| 5,778,189 A | * | 7/1998 | Kimura et al. ............... 709/236 |
| 5,778,226 A | | 7/1998 | Adams et al. ................ 719/311 |
| 5,812,768 A | | 9/1998 | Pagé et al. |
| 5,896,383 A | | 4/1999 | Wakeland |
| 6,272,400 B1 | * | 8/2001 | Jankins et al. ............... 700/282 |
| 6,278,697 B1 | * | 8/2001 | Brody et al. ................. 370/310 |
| 2002/0116453 A1 | * | 8/2002 | Todorov et al. ............. 709/203 |
| 2003/0023795 A1 | * | 1/2003 | Packwood et al. .......... 710/105 |
| 2004/0138786 A1 | * | 7/2004 | Blackett et al. ............. 700/295 |

FOREIGN PATENT DOCUMENTS

DE  42 29 931  3/1994

(Continued)

OTHER PUBLICATIONS

Search Report and Translation for German Patent No. 102 43 783.1.

*Primary Examiner*—Anthony Knight
*Assistant Examiner*—Ronald D Hartman, Jr.
(74) *Attorney, Agent, or Firm*—Harness, Dickey & Pierce

(57) ABSTRACT

An electronic apparatus forming a sensor, an actuator or a control is described comprising a control engine and an integrated bus interface via which the apparatus can be connected to a data bus for the communication of the apparatus with at least one further apparatus connected to the data bus and forming a sensor, an actuator or a control. The communication, i.e. the transmission and/or the reception of data via the data bus, takes place via any desired predetermined communication protocol. The control engine includes an application-specific engine and a bus protocol-specific engine which are decoupled from one another and exchange application-specific data via a pre-determined, standardized interface. The bus protocol-specific engine is made for the transmission and/or the reception of data via the bus interface. The application-specific section is made for the control of the apparatus independently of the bus protocol used. Data received via the standardized interface can be converted into the bus protocol and/or data received via the bus interface can be converted into corresponding application-specific data by the bus protocol-specific engine.

10 Claims, 1 Drawing Sheet

FOREIGN PATENT DOCUMENTS

| | | |
|---|---|---|
| DE | 44 17 434 | 11/1995 |
| DE | 195 43 036 | 12/1996 |
| DE | 196 46 219 | 12/1997 |
| DE | 693 15 785 | 4/1998 |
| DE | 197 00 353 | 7/1998 |
| DE | 199 40 230 | 3/2000 |
| DE | 198 47 701 | 4/2000 |
| DE | 198 49 810 | 5/2000 |
| DE | 199 52 391 | 6/2000 |
| DE | 199 19 473 | 11/2000 |
| DE | 100 57 625 | 5/2001 |
| DE | 694 28 512 | 5/2002 |
| DE | 101 09 196 | 9/2002 |
| EP | 1 199 846 | 4/2002 |

\* cited by examiner

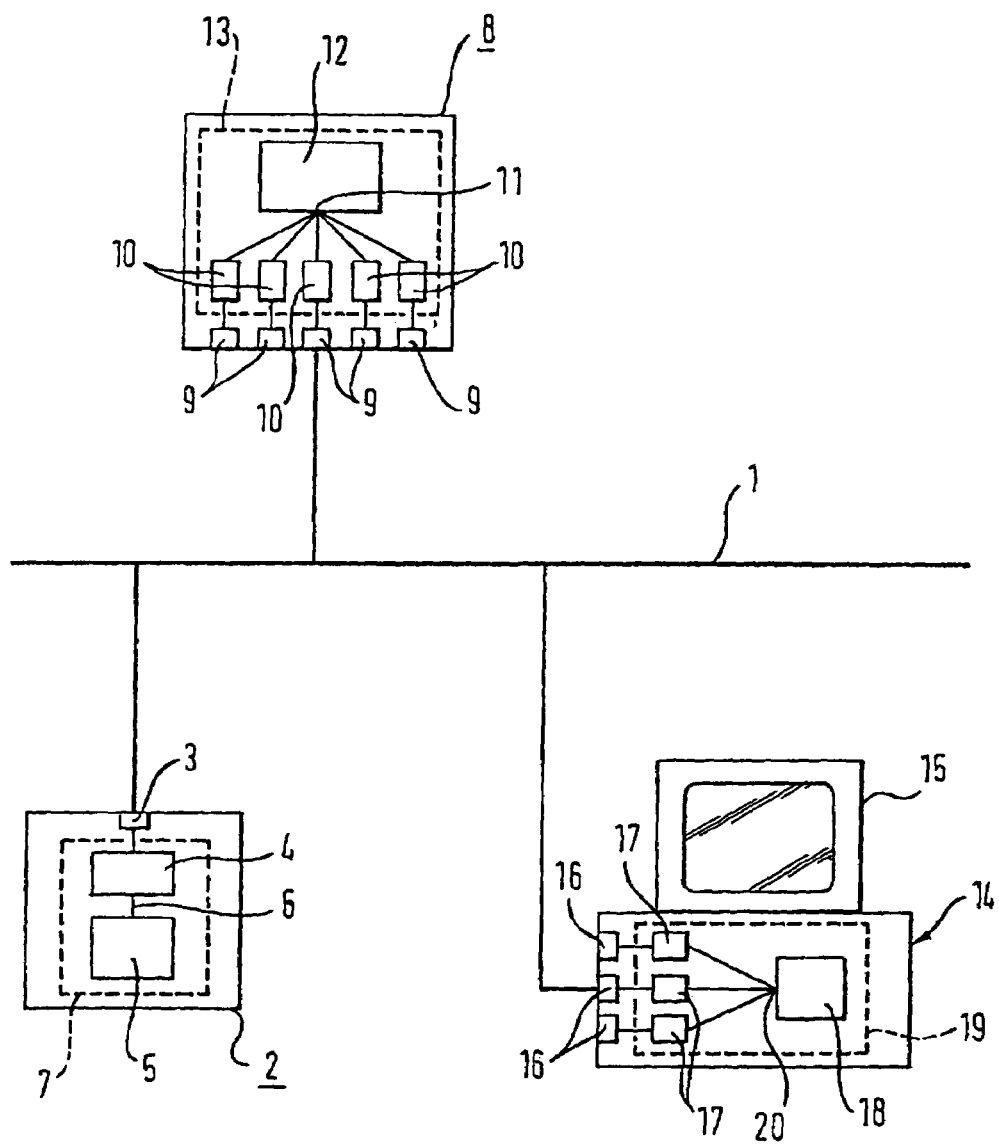

ELECTRONIC APPARATUS FOR A BUS SYSTEM

CROSS-REFERENCE TO RELATED APPLICATIONS

This application claims priority to German Patent Application No. 102 43 783.1 filed Sep. 20, 2002, which application is herein expressly incorporated by reference.

BACKGROUND OF THE INVENTION

The present invention relates to an electronic apparatus forming a sensor, an actuator or a control and comprising a control engine and an integrated bus interface via which the apparatus can be connected to a data bus for the communication of the apparatus with at least one further apparatus connected to the data bus, with the communication, i.e. the transmission and/or reception of data via the data bus, taking place via any desired pre-determined communication protocol (bus protocol).

In many areas of application of automation technology, different devices nowadays communicate with one another via a bus system. A plurality of different bus systems are known based on different communication protocols. Starting with the physical layer, up to the application interface of the individual devices, the fieldbus specifications are each specifically defined in accordance with their area of application.

To allow communication for a plurality of different bus protocols, it is mandatory for the device manufacturers that they must realize a separate implementation of the application running on the device for each fieldbus protocol for each device (sensor, actuator or control). Interoperable data communication is not possible due to the different concepts of different fieldbuses.

To be able to use every device with every fieldbus, the device manufacture can either make every device available in different variants, in each case for a specific fieldbus, or it can equip the devices with a plurality of different bus interfaces in order only to have to provide one device per model in this manner.

It is, however, disadvantageous in both variants that the respective application running in the device does not only have to be specifically developed for the device, but in particular also specifically for the respective fieldbus protocol used. In the first named case, the development of a plurality of different applications for one device type is necessary, whereas in the second case admittedly only one application has to be developed, but this must be capable of being able to communicate with each of the required fieldbus protocols. The more bus systems that exist and have to be covered, the higher the development costs and the manufacturing costs of corresponding devices. This is no longer economic in a number of cases so that a reduction of the costs in the development and in the manufacture of the devices is desired.

Since the bus systems are not pre-determined by the device manufacturers, but by the customers in dependence on the area of application, it must be ensured that the devices can work with a plurality of different bus systems.

It is also disadvantageous in the plurality of different bus systems that a separate operating software has to be made available in each case for a configuration and diagnosis (parameterization) of the devices, which customarily takes place via the bus system, and said operating software then likewise has to be matched to the different bus systems and their respective addresses, which causes additional effort and costs associated therewith.

Furthermore, in a number of fieldbus systems, the assignment of parameters and functions to specific variables, addresses or channels is carried out in so-called profiles in a number of fieldbus systems. These profiles are not only dependent on the respective fieldbus, but also on the respective area of application. If a device is intended to be used in different fields of application, an adaptation of the application to the respective profile must be carried out in every single case. The also applies in particular when the standard underlying the profile is changed.

The matching of the respective application to different fieldbus protocols requires special knowledge on the individual fieldbuses among the respective developer groups. Since separate specialists are usually present in the development departments for each fieldbus, a high personnel effort is required in the event of an adaptation of the application.

SUMMARY OF THE INVENTION

It is an object of the invention to provide a cost-favorable and flexible solution with which different electronic apparatuses of the initially named kind (sensors, actuators or controls) can be connected to the most varied bus systems with different bus protocols. The adaptation of an application on a change to a profile should also be possible without problem. Furthermore, the effort for the configuration and diagnosis of the individual devices should also be reduced.

This object is satisfied in accordance with the invention starting from an electronic apparatus of the initially named kind in that the control engine includes an application-specific engine and a bus protocol-specific engine which are decoupled from one another and exchange application-specific data via a pre-determined, standardized interface, in that the bus protocol-specific engine is designed for the transmission and/or for the reception of data via the bus interface, in that the application-specific engine is designed for the control of the apparatus independently of the bus protocol used, and in that data received by the bus protocol-specific engine via the standardized interface can be converted into the bus protocol and/or data received via the bus interface can be converted into corresponding application-specific data.

In accordance with the invention, an encapsulation of the application running in the control engine of the electronic apparatus thus takes place and thus a separation of the application (business logic) from the communication logic of the device.

This decoupling provides a plurality of advantages. On the one hand, the application-specific engine (application) can be developed independently of the bus protocol to be used in each case, since the communication between the application-specific engine and the bus protocol-specific engine takes place via a standardized interface. If the device should be able to be used for a plurality of different bus systems, only the development of respectively different bus protocol-specific engines adapted in each case to the respective bus system is necessary. A change of the application-specific engine is not necessary in this case.

On the other hand, required changes to the application which become necessary, for example, due to a changed profile can also be made independently of the respectively used bus protocol. The developer responsible for the change thus does not need any special knowledge relating to the respective bus protocol such that one and the same developer can adapt applications which are used for a plurality of different bus protocols.

It is furthermore possible in accordance with the invention, to address device parameters independently of the respective fieldbus implementation so that the connection to configuration and diagnostic software is simplified. For this purpose, it is only necessary for a corresponding configuration apparatus likewise to be designed in the manner of an electronic apparatus in accordance with the invention, with the application-specific engine of the configuration apparatus forming a configuration engine whose standardized interface is the same as the standardized interface of the apparatus to be configured. It is ensured in this manner that the apparatus to be configured and the configuration apparatus each have the same internal fieldbus-independent address. As with the apparatus to be configured, only the respective bus protocol-specific engine responsible for the communication also has to be implemented in the configuration apparatus for each fieldbus protocol to be supported, whereas the application-specific engine, i.e. the configuration engine of the configuration apparatus, can be used independently of the fieldbus protocol used.

In accordance with an advantageous embodiment of the invention, the control engine includes a plurality of bus protocol-specific engines of which each is respectively associated with one of a plurality of different bus protocols, with each bus protocol-specific engine respectively being made for the conversion of the application-specific data into the bus protocol associated with it and/or for the conversion of the data received via the bus interface in the bus protocol associated with it into the application-specific data. In this manner, an apparatus made in accordance with the invention can be used for a plurality of different bus protocols, without the respective bus protocol-specific engine having to be replaced on a change of the bus system used by a correspondingly changed bus protocol-specific engine.

A different bus interface is advantageously associated with each bus protocol-specific engine. Since the different bus systems are usually characterized by different physical interfaces (plug connections and converters), it is necessary to equip every electronic apparatus in accordance with the invention with a plurality of corresponding plug connections. In this case, every bus protocol-specific engine can be directly associated with the corresponding physical bus interface such that the respectively assigned bus protocol-specific engine can be used automatically by connecting the device to the respective bus system.

It is generally also possible that, in accordance with a further advantageous embodiment, at least some or all bus protocol-specific engines are associated with a single bus interface and that a selection unit is provided for the selection of the bus protocol-specific engine to be used in each case. It is possible for both a manual selection of the bus protocol-specific engine to take place via the selection unit and for the selection unit of the bus protocol-specific engine to take place automatically, based on the currently used bus protocol in each case. This embodiment is in particular sensible when different bus systems can be connected to the electronic apparatus in accordance with the invention via uniform physical interfaces (possibly using an adapter).

In accordance with a further advantageous embodiment of the invention, a set of elements is pre-determined for the communication with the control engine which each define a type of permitted application-specific data. In particular variables and/or methods and/or messages and/or events are pre-determined as elements.

In accordance with the invention, an object-oriented structure is thus used as the basis for the definition of the standardized interface. The said methods can be methods which are carried out on the respective device itself or on another device. Methods which are called up on the device itself usually carry out a specific function which can either serve for the device to carry out a pre-determined action or for a special result of the function to be obtained as a feedback value. It is likewise possible for both an action to be carried out and for a feedback value to be obtained. Messages are elements which are either received or sent. All specified categories do not necessarily always have to be realized either with respect to the methods or to the messages depending on the application.

The variables are commonly used elements which, unlike the methods and the messages, are bidirectional. The variables must have a type which must be unambiguously defined. In particular, for example, the length (byte) of the variable (for example, the length of an integral value) as well as the type of its serialization must be defined.

In addition to the usual basic types, the type of the variable can furthermore be, for example, a structure or an array. The structure or the array in turn have subordinate type definitions which can likewise again be structures, arrays or simple types (basic types). It is important that only basic types are used at the lowest definition level.

An algorithm is pre-determined for the transmission of the variables via the bus system which lays down the serialization and deserialization of basic types and complex structures and defines how type information can be compared with one another or can be identified at the run time.

Methods have a feedback value and a finite number of parameters. The type of the feedback value and the types of the individual parameters are defined analog to the type definition of commonly used variables. Likewise, their transmission as a byte stream via the bus systems is treated analogously as with the variables.

Further properties for the description of the variables and of the methods can be used for the optimization of the encapsulation of the application. These can be the following properties, for example:

the communication direction of variables;
the transmission properties of methods;
the non-ambiguity of the method call-up;
the non-ambiguity of the result transmission;
methods without feedback information (these special methods are usually called events);
the prioritization of communication objects.

Advantageous application-specific pre-determined settings of the apparatuses to be configured can be read out and/or set using the configuration apparatus made in accordance with the invention. The configuration apparatus can thus be used both for configuration and for a diagnosis of an electronic apparatus made in accordance with the invention. The configuration apparatus is preferably designed as a computer, in particular as a conventional personal computer or as a handheld (PDA), and the configuration engine and the bus control-specific engine are each made as computer programs. If a bus protocol different from the previously used bus protocol should be used instead of it, only the computer program which represents the bus protocol-specific engine has to be adapted to the new bus protocol. A change of the actual configuration program is not necessary. In particular, the interface of the configuration program is thus independent of the bus protocol used such that the user can carry out a change from one bus system to another bus system without problem.

For the complete integration of the devices made in accordance with the invention into a fieldbus, it is advantageous if, in addition to the fieldbus-independent communication, an implementation of the most important elements is carried out according to the requirement of the fieldbus profiles. Since the number of elements which are usually used by customers in their own programs or in outside programs is very much smaller than the number of elements (variables/functions) present in the device, it is possible to address the elements usually frequently used by the users via address channels specific to the device manufacturer which are familiar to the users.

In accordance with the invention, there exist for different fieldbuses for each bus protocol-specific engine algorithms for the reading and writing of variables, algorithms for the calling up of methods on the device or on another device and algorithms which the device transmits to a further device, for example to a master or to a specific subscriber to the network.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

The FIGURE shows a schematic block diagram of a bus system made in accordance with the invention comprising a data bus 1 to which a device 2 forming a sensor, an actuator or a control is connected. The device 2 has, for this purpose, an integrated bus interface 3 which is made for the connection to the data bus 1.

DETAILED DESCRIPTION OF THE PREFERRED EMBODIMENTS

The following description of the preferred embodiment(s) is merely exemplary in nature and is in no way intended to limit the invention, its application, or uses.

A bus protocol-specific engine 4, which is usually made as a program and which is connected to the interface 3 and is made for the transmission and/or reception of data via the bus interface 3, is formed in the device 2. The bus protocol-specific engine 4 is thus made both to receive data received via the data bus 1 and present in the bus protocol used and, optionally, to transmit data in this format.

Furthermore, an application-specific engine 5, which is decoupled from the bus protocol-specific engine 4 and which exchanges application-specific data with the bus protocol-specific engine 4 via a standardized interface 6, is provided in the device 2. This engine 5 is also usually realized as a program.

The application-specific engine 5 forms the so-called application of the device 1 and is independent of the respectively used bus protocol of the data bus 1. The bus protocol-specific engine 4 forms—together with the application-specific engine 5—a control engine 7 of the device 2 with which the function and the communication of the device 2 are carried out.

The FIGURE furthermore shows a second device 8 whose design is very similar to the design of the device 2. The device 8 differs from the device 2 in that a plurality of internal interfaces 9 are provided in place of one single internal interface 3. Each of the internal interfaces 9 is made for coupling to another bus system.

A separate bus protocol-specific engine 10 is furthermore provided in the device 8 for each internal interface 9 and is made in each case for the reception and/or transmission of data via the bus protocol associated in each case with the internal interface 9.

Each of the bus protocol-specific engines 10 is connected via the same, uniform, standardized interface 11 to an application-specific engine 12 which—together with the different bus protocol-specific engines 10—in turn forms a control engine 13 of the device 8.

Whereas the device 2 is admittedly generally suitable also to be used on a change of the bus protocol in that only the bus protocol-specific engine 4 is correspondingly newly implemented, with it being required that the corresponding bus system can be connected to the device 2 via the interface 3, optionally using an adapter, the device 8 has the advantage, in contrast, that it has already been prepared for a plurality of different bus protocols. By the selection of the corresponding internal interface 3 for the connection of the bus system, the correct bus protocol-specific engine 10 is automatically activated and the device 8 put into function.

The communication between the device 2 and the device 8 takes place in accordance with the invention via the same standardized interface 6, 11 in that in each case the two application-specific engines 5, 12 of the two devices 2, 8 send or receive standardized application-specific data which are converted in each case by the bus protocol-specific engines 4, 9 into the correct bus protocol of the data bus 1.

Furthermore, a device 14 which is connected to the data bus 1 and which is made as a personal computer is shown in the FIGURE. The device 14 has a display unit 15 as well as a plurality of internal interfaces 16 which are each made for the connection to different data buses 1 and can, for example, be realized by one or more plug-in cards.

The device 14 furthermore includes a plurality of bus protocol-specific devices 17 of which each is associated with one of the internal interfaces 16. As already described with respect to the device 8, each of the bus protocol-specific engines 17 is made for the transmission and/or reception of data in another bus protocol.

The bus protocol-specific engines 17 are in turn connected via a uniform, standardized interface 20 to an application-specific engine 18 which is designed as communication and/or diagnostic software and forms a control engine 19 of the device 14 together with the bus protocol-specific engines 17. Standardized application-specific data can thus be transmitted via the data bus 1 to each of the devices 2, 8 connected to the data bus 1 via the configuration/diagnostic program 18 in the same manner as previously described with respect to the devices 2 and 8. In this manner, both the reading out and the setting of parameters is possible in the devices 2 and 8 via the configuration/diagnostic software 18, without the configuration/diagnostic software 18 having to be specifically tailored to the bus protocol used.

If the data bus 1 is replaced by a data bus on which another bus protocol is used, the device 14 only has to be connected to the new data bus via the internal interface corresponding to this data bus. After the coupling, the user can directly configure the devices connected to the new data bus using the same configuration/diagnostic software 18, without a new implementation or change of the configuration/diagnostic software 18 being necessary.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electronic apparatus forming one of a sensor, an actuator and a control that communicates with at least one additional electronic apparatus via a data bus using a pre-determined communications protocol, the electronic apparatus comprising:
   a bus interface;
   a control engine that comprises:
      an application-specific engine that controls the electronic apparatus independently of the pre-determined communications protocol; and
      a bus protocol-specific engine that transmits and receives data via a bus interface;
   wherein said application-specific engine and said bus protocol-specific engine are decoupled from one another and said bus protocol-specific engine exchanges application-specific data with said application-specific engine via a standardized interface;
   wherein data received via the standardized interface is converted into the pre-determined communications protocol by the bus-protocol-specific engine and data received via the bus interface is converted into corresponding application-specific data by the bus-protocol-specific engine;
   wherein the control engine includes a plurality of bus protocol-specific engines and a plurality of bus protocols, each of the bus protocol-specific engines being associated with a bus protocol and wherein each bus protocol-specific engine converts application-specific data into the associated bus protocol and converts data received via the bus interface in the associated bus protocol into application-specific data;
   wherein at least some of the bus protocol-specific engines are associated with a single bus interface and a selection unit selects a respective bus protocol-specific engine to be used; and
   wherein the bus protocol-specific engine is automatically selected using the selection unit based on a currently implemented bus protocol.

2. The electronic apparatus of claim 1, wherein a different bus interface is associated with each bus protocol-specific engine.

3. The electronic apparatus of claim 1, wherein a set of elements is communicated to the control engine, each of which defines a type of permitted application-specific data.

4. The electronic apparatus of claim 3, wherein said set of elements includes at least one of variables, methods, messages and events.

5. A configuration apparatus for configuring an electronic apparatus that is one of a sensor, an actuator and a control, the configuration apparatus communicating with the electronic apparatus via a data bus using a pre-determined communications protocol and comprising:
   a bus interface;
   a configuration engine that comprises:
      an application-specific engine that controls the configuration apparatus independently of the pre-determined communications protocol; and
      a bus protocol-specific engine that transmits and receives data via a bus interface;
   wherein said application-specific engine and said bus protocol-specific engine are decoupled from one another and said bus protocol-specific engine exchanges application-specific data with said application-specific engine via a standardized interface that is common to a standardized interface of the electronic apparatus;
   wherein data received via the standardized interface is converted into the communications protocol by the bus-protocol-specific engine and data received via the bus interface is converted into corresponding application-specific data by the bus-protocol-specific engine; and
   wherein the configuration apparatus reads out and sets application-specific pre-determined settings of the electronic apparatus that is to be configured.

6. The configuration apparatus of claim 5, wherein the configuration apparatus is provided as a computer and the configuration engine and the bus protocol-specific engine are provided as computer programs.

7. The configuration apparatus of claim 6, wherein the computer includes at least one of a personal computer (PC) and a handheld device.

8. The configuration apparatus of claim 7, wherein the hand-held device is a PDA.

9. A bus system, comprising:
   a data bus; and
   a plurality of electronic apparatuses each of which is one of a sensor, an actuator and a control that communicates with at least one additional electronic apparatus via a data bus using a pre-determined communications protocol and each of which comprises:
      a bus interface;
      a control engine that includes an application-specific engine that controls the electronic apparatus independently of the pre-determined communications protocol; and
      a bus protocol-specific engine that transmits and receives data via a bus interface;
   wherein said application-specific engine and said bus protocol-specific engine are decoupled from one another and said bus protocol-specific engine exchanges application-specific data with said application-specific engine via a standardized interface;
   wherein data received via the standardized interface is converted into the pre-determined communications protocol by the bus-protocol-specific engine and data received via the bus interface is converted into corresponding application-specific data by the bus-protocol-specific engine;
   wherein the control engine includes a plurality of bus protocol-specific engines and a plurality of bus protocols, each of the bus protocol-specific engines being associated with a bus protocol and wherein each bus protocol-specific engine converts application-specific data into the associated bus protocol and converts data received via the bus interface in the associated bus protocol into application-specific data;
   wherein at least some of the bus protocol-specific engines are associated with a single bus interface and a selection unit selects a respective bus protocol-specific engine to be used; and
   wherein the bus protocol-specific engine is automatically selected using the selection unit based on a currently implemented bus protocol.

10. The bus system of claim 9, wherein each of the bus protocol-specific engines are associated with a single bus interface and a selection unit determines which bus protocol-specific engine is implemented.

* * * * *